United States Patent [19]

Jaeger

[11] 4,043,254

[45] Aug. 23, 1977

[54] APPARATUS FOR CUSHIONING THE MOTION OF A RECIPROCATING MEMBER

[75] Inventor: Eginhard Jaeger, Oetwil an der Limmat, Switzerland

[73] Assignee: Emhart Industries, Inc., Farmington, Conn.

[21] Appl. No.: 529,208

[22] Filed: Dec. 3, 1974

[51] Int. Cl.² .............................................. F01B 11/02
[52] U.S. Cl. ....................................... 92/85 B; 65/361; 92/10; 92/114; 92/143; 138/44; 188/287; 188/315
[58] Field of Search .................... 65/361; 92/8, 9, 10, 92/11, 12, 13.5, 13.6, 80, 82, 85, 87, 114, 143; 188/287, 315; 138/37, 44

[56] References Cited

U.S. PATENT DOCUMENTS

| 523,242 | 7/1894 | Smith | 92/9 |
|---|---|---|---|
| 2,783,742 | 3/1957 | Shafer | 91/407 |
| 2,792,915 | 5/1957 | Smith | 92/9 X |
| 2,793,623 | 5/1957 | Ludwig | 92/125 X |
| 2,815,004 | 12/1957 | Droman | 92/85 X |
| 2,833,312 | 5/1958 | Flick | 138/44 |
| 2,915,043 | 12/1959 | Neiner | 92/12 X |
| 2,922,397 | 1/1960 | Haanes | 92/13.6 X |
| 2,991,760 | 7/1961 | Rhine | 92/114 X |
| 3,138,066 | 6/1964 | Walker | 91/408 |
| 3,148,595 | 9/1964 | Looney | 92/11 |
| 3,323,550 | 6/1967 | Lee | 138/37 |
| 3,495,965 | 2/1970 | Kurtz | 65/361 X |
| 3,598,206 | 8/1971 | Hennells | 188/287 |
| 3,830,139 | 8/1974 | Wachsman | 92/9 |

FOREIGN PATENT DOCUMENTS

| 636,433 | 8/1962 | Belgium | 188/287 |

Primary Examiner—Martin P. Schwadron
Assistant Examiner—Abraham Hershkovitz
Attorney, Agent, or Firm—McCormick, Paulding & Huber

[57] ABSTRACT

An apparatus for hydraulically cushioning the motion of reciprocating means is provided by first hydraulic cushioning means which is adapted to be contacted by the reciprocating means near the end of its stroke in the direction of the first hydraulic cushioning means, second hydraulic cushioning means adapted to be contacted by the reciprocating means near the end of its stroke in the direction of the second hydraulic cushioning means, and means for adjusting the position at which the reciprocating means contacts at least one of said first and second hydraulic cushioning means.

7 Claims, 5 Drawing Figures

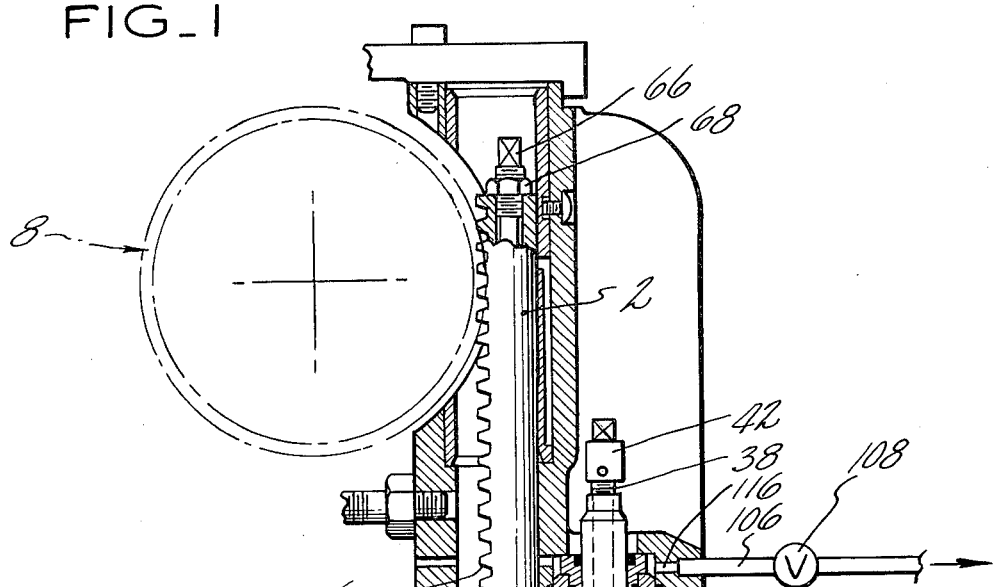
FIG_1
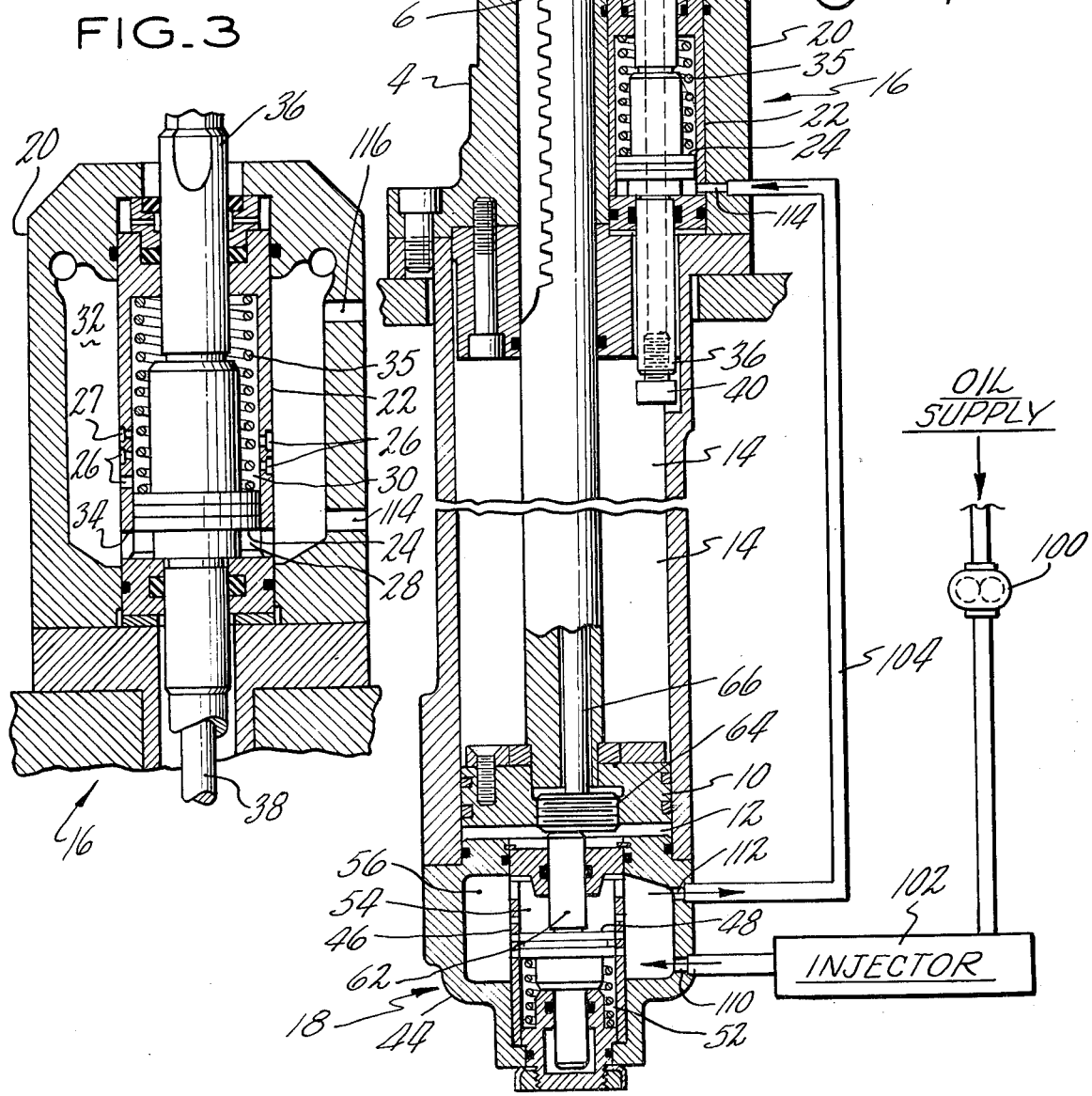
FIG_3

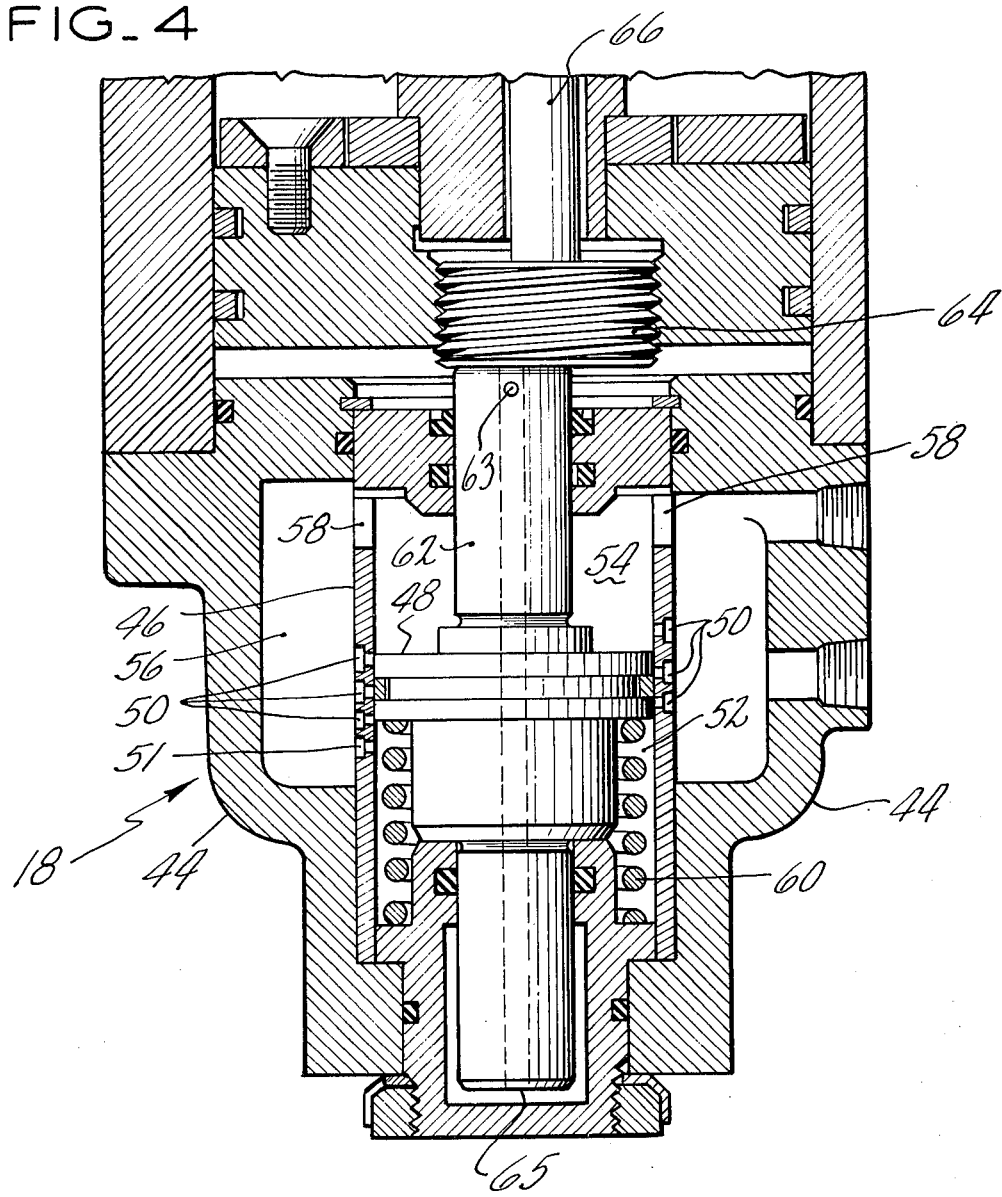
FIG_4
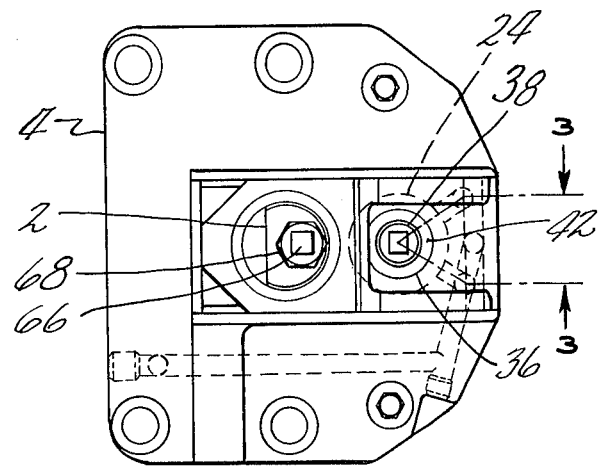
FIG_2

FIG_5
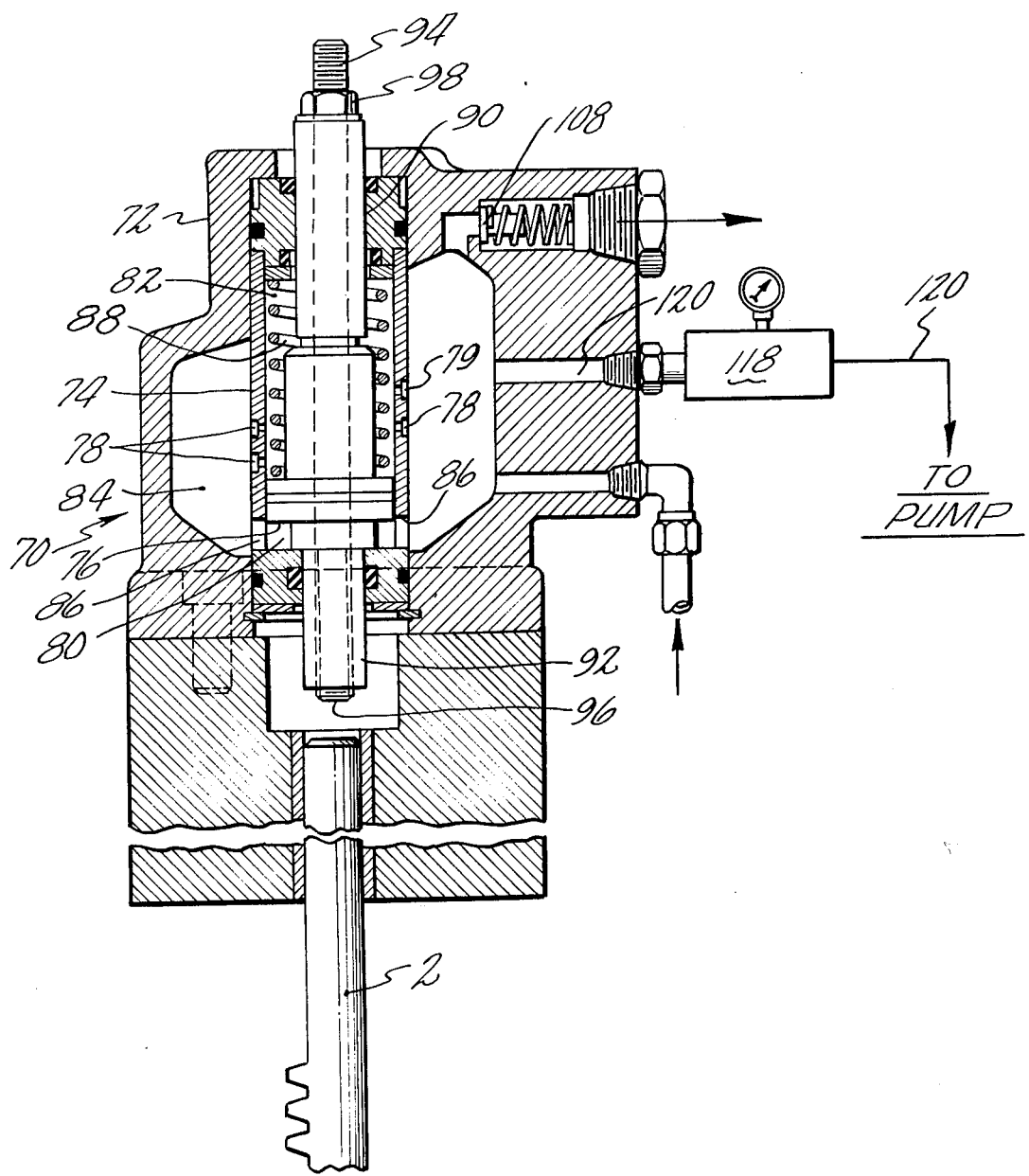

APPARATUS FOR CUSHIONING THE MOTION OF A RECIPROCATING MEMBER

BACKGROUND OF THE INVENTION

This invention relates to apparatus for cushioning the motion of a reciprocating machine part and finds particular utility in cushioning the air-operated working piston of a neck ring invert mechanism or take-out mechanism of a Hartford individual section (I. S.) type glassware forming machine.

The typical Hartford I. S. glassware forming machine comprises six, eight or 10 individual sections arranged together in side-by-side relationship. Each section comprises a self-contained unit which includes a blank (or parison) mold station and a blow mold station. Molten glass gobs are delivered by means of a gob distribution system, as shown for example in U.S. Pat. No. 3,721,544, in a predetermined sequence to the upwardly open blank molds of each section. The gob of molten glass is formed into a parison at the blank station, and then transferred to the blow station by a neck ring invert mechanism which includes a neck mold. The neck mold mates with the blank mold at the blank station and also supports the parison during its inversion and transfer to the blow station. At the blow station the blow mold is closed around the parison and supports the parison just below its finish, allowing the neck ring to be opened, and the neck ring invert mechanism then reverts the neck ring mold to the blank station. Air is delivered to the interior of the parison and the ware is formed in the blow mold into its final shape. After the air is shut off, the blow mold opens and tongs move into the blow station, close around the newly formed ware, and the article is taken out of the blow station by a take-out mechanism and transferred to the deadplate portion of a take-away conveyor system. A good description of the Hartford type I. S. machine can be seen in U.S. Pat. No. 1,911,119, and a typical neck ring invert mechanism is shown in FIGS. 4 and 5 of that patent.

Attempts have been made to cushion the reciprocating member of the neck ring invert mechanism and the reciprocating member of the take-out mechanism, but the means utilized for this purpose have not been entirely satisfactory. Pneumatic cushioners are known, for example, for cushioning neck ring invert mechanisms and glass cutting shears; see U.S. Pat. No. 2,518,871, for example. However, pneumatic cushioners have the disadvantage that when the mechanism to be cushioned is located in an inaccessible place, such as the inside of a section box of an I. S. glassware forming machine, it is extremely difficult to adjust the position at which the pneumatic cushion becomes operative. This is so because the air line through which the air cushioning the piston is allowed to bleed to atmosphere (through an adjustable orifice which regulates the cushioning) must be long in order to place the adjustable orifice in a position accessible to the machine operator. The length of the air line causes a large drop in the pressure of the air passing therethrough with the result that the adjusting means has no sensitivity in controlling the cushioning. The inaccessible locations of the neck ring invert mechanism and the take-out mechanism of an I. S. glassware forming machine make the use of pneumatic cushioner undesirable.

My invention overcomes the problems inherent in a pneumatic cushioning system and allows adjustment of a hydraulic cushioning means used to cushion mechanisms which are relatively inaccessible.

SUMMARY OF THE INVENTION

The object of the present invention is to cushion the movement of a reciprocating member.

Another object of the invention is to provide apparatus for cushioning the motion of reciprocating means in which the position at which the cushioning beomes operative may be adjusted, especially when the cushioning means is located in a relatively inaccessible place, as for example in an I. S. glassware forming machine.

In accordance with the present invention, an apparatus for hydraulically cushioning the motion of reciprocating means in both directions is provided by the combination of first hydraulic cushioning means disposed to be contactable by the reciprocating means in one direction, the first hydraulic cushioning means comprising a first housing, a cylinder disposed in the first housing, the cylinder having a plurality of metering orifices therein, a piston slidably disposed in the cylinder and forming with the cylinder a first chamber on on side of the piston and a second chamber on the opposite side of the piston, a third chamber adapted to be filled with liquid, disposed between the first housing and the cylinder and in fluid communication with the first and second chambers, the piston adapted to be contacted by the reciprocating means near the end of the stroke of the reciprocating means in the direction of the first cushioning means; second hydraulic cushioning means disposed to be contactable by the reciprocating means to cushion the motion of the reciprocating means in the opposite direction, the second cushioning means comprising a second housing, a cylinder disposed in the second housing, the cylinder having a plurality of metering orifices therein, a piston slidably disposed in the cylinder and forming with the cylinder a first chamber on one side of the piston and a second chamber on the opposite side of the piston, a third chamber adapted to be filled with liquid, disposed between the second housing and the cylinder and in fluid communication with the first and second chambers, the piston adapted to be contacted by the reciprocating means near the end of the stroke of the reciprocating means in the direction of the second cushioning means; and means for adjusting the position at which the reciprocating means contacts at least one of the first and second hydraulic cushioning means.

In accordance with a further aspect of the invention, the total volume of the first, second and third chambers of each of the hydraulic cushioning means remains constant during operation of the cushioning means so that the hydraulic oil within each cushioning means circulates only within the housing for the particular cushioning means.

In accordance with a still further aspect of the invention, the use of several metering orifices in the cylinder of each hydraulic cushioning means having a dimension in the direction of flow of fluid therethrough which is small in comparison with the diameter of the orifice results in a cushioning means which is substantially insensitive to the viscosity of the hydraulic oil over the working temperature range of the device.

The foregoing and other objects, features and advantages of the present invention will become more apparent in light of the following detailed description of a preferred embodiment thereof as illustrated in the accompanying drawings.

BRIEF DESCRIPTION OF THE DRAWINGS

FIG. 1 is a sectioned elevation of an apparatus for hydraulically cushioning the motion of reciprocating means in both directions in accordance with the present invention.

FIG. 2 is a plane view of the apparatus shown in FIG. 1.

FIG. 3 is a partial sectioned elevation taken along line 3—3 of FIG. 2.

FIG. 4 is a partial enlarged view of FIG. 1 showing the lower hydraulic cushioning unit in greater detail.

FIG. 5 is a partial sectioned elevation of another embodiment of a hydraulic cushioning apparatus in accordance with the present invention.

DESCRIPTION OF THE PREFERRED EMBODIMENT

Referring to the drawings wherein like numerals refer to like components and particularly to FIG. 1, there is shown a reciprocating rack gear 2 slidably disposed in a housing 4. The rack has teeth 6 disposed thereon for meshing with teeth on a gear 8. The rack 2 has a working piston 10 disposed on one end thereof. By alternately pressurizing the chambers 12 and 14 with air through air lines (not shown), the piston will reciprocate the rack 2 back and forth within the housing 4. As the rack reciprocates, the gear 8 will be rotated, first in one direction and then in the opposite direction. The gear 8 may be connected to an I. S. glassware forming machine neck ring invert mechanism (not shown) or take-out mechanism (not shown), for example, or any other mechanism to be moved back and forth. The object of my invention is to cushion the motion of a reciprocating element, such as the rack 2, as it reaches the end of its travel in each direction.

The cushioning is accomplished by first hydraulic cushioning means indicated generally at 16 and shown best in FIG. 3, and second hydraulic cushioning means indicated generally at 18 and shown best in FIG. 4. The first hydraulic cushioning means 16 comprises a housing 20, a cylinder 22 disposed in the housing 20, and a piston 24 slidably disposed in the cylinder 22. The cylinder has a plurality of metering orifices 26 therein. The piston 24 and the cylinder 22 form a first chamber 28 on one side of the piston and a second chamber 30 on the other side of the piston. A third chamber 32 is formed between the housing 20 and the outer wall of the cylinder 22 and is adapted to be filled with liquid. The chamber 32 is in fluid communication with the first chamber 28 and the second chamber 30 through the metering orifices 26 and 27 and the orifices 34. Resilient means, such as a spring 35, are disposed within the cylinder 22 to return the piston 24 to its cushioning position when the hydraulic cushioning means 16 is not in contact with the rack 2. The piston 24 has means adapted to be contacted by the reciprocating rack 2 as the rack nears the end of its stroke in the direction of the first hydraulic cushioning means 16. The means may comprise a hollow shaft 36 which may be an extension of the piston 24. The longitudinal axis of the shaft is substantially parallel to the axis of the piston 24, and preferably the shaft 36 is coaxial with the piston 24. The hollow shaft 36 has a shaft 38 passing therethrough and through the piston 24. Contact means 40 is adjustably disposed in shaft 36 and may be part of shaft 38 or operatively connected thereto for movement therewith. Adjustable locking means 42 are adapted to engage the opposite end of the shaft 38 for adjustably locking the shaft 38 with respect to the piston 24 and the hollow shaft 36.

The second hydraulic cushioning means 18 comprises a housing 44 disposed at one end of the housing 4, a cylinder 46 disposed in the housing 44, and a piston 48 slidably disposed in the cylinder 46. The cylinder 46 has a plurality of metering orifices 50 and 51 disposed therein. The piston 48 and the cylinder 46 form a first chamber 52 on one side of the piston and a second chamber 54 on the other side of the piston. A third chamber 56 is formed between the housing 44 and the outer wall of the cylinder 46 and is adapted to be filled with liquid. The chamber 56 is in fluid communication with the first chamber 52 and the second chamber 54 through the metering orifices 50 and 51 and the orifices 58. Resilient means, such as a spring 60, are disposed within the cylinder 46 to return the piston 48 to its cushioning position when the hydraulic cushioning means 18 is not in contact with the rack 2. The piston 48 has means adapted to be contacted by the reciprocating rack 2 as the rack nears the end of its stroke in the direction of the second hydraulic cushioning means 18. The means may comprise a shaft extension 62 of the piston 48, which is preferably coaxial with the piston 48, and a contact member 64 threadably engagable with the working piston 10, which is part of the rack 2, disposed on one end of a shaft 66, the shaft 66 passing through the rack 2 and being threaded at the longitudinal axis of the shaft 66 is substantially parallel to the axis of the rack 2. At the end of shaft 66, opposite to that on which contact member 64 is disposed, is disposed an adjustable locking member 68 for adjustably locking the shaft 66 with respect to the reciprocating member, the rack 2. The piston 48 and shaft extension 62 may have holes 63 and 65 therein so that the pressure on both sides of the piston are equal and do not counteract the force of the spring 60.

FIG. 5 shows another embodiment of the hydraulic cushioning means in accordance with the present invention. In this embodiment the hydraulic cushioning means, shown generally at 70, is disposed above the reciprocating means, which may be a rack gear 2. The hydraulic cushioning means comprises a housing 72, a cylinder 74 disposed in the housing 72, and a piston 76 slidably disposed in the cylinder 74. The cylinder has a plurality of metering orifices 78 and 79 disposed therein. The piston 76 and the cylinder 74 form a first chamber 80 on one side of the piston and a second chamber 82 on the opposite side of the piston. A third chamber 84 is formed between the housing 72 and the outer wall of the cylinder 74 and is adapted to be filled with liquid. The chamber 84 is in fluid communication with the first chamber 80 and the second chamber 82 through the metering orifices 78 and 79 and orifices 86. Resilient means, such as a spring 88, are disposed within the cylinder 74 to return the piston 76 to its cushioning position when the hydraulic cushioning means 70 is not in contact with the rack 2. The piston 76 has means associated therewith adapted to be contacted by the reciprocating rack gear 2 as the rack 2 nears the end of its travel in the direction of the hydraulic cushioning means 70. The means may comprise hollow shaft extensions 90 and 92 of the piston 76, which extends in both directions axially outwardly of the piston 76. The lower portion 92 is threaded internally to receive a threaded shaft 94. Contact means 96 comprises the lowermost end of the threaded shaft 94. Adjustable locking means 98, which may be a nut threadably received on the upper end of threaded shaft 94, are provided for adjustably locking the shaft 94 with respect to the piston 76 and hollow shaft extensions 90 and 92.

The operation of the hydraulic cushioning means will now be described. Since the principle of operation is the same for hydraulic cushioning means 16, 18 and 70, the operation of only cushioning means 16 will be described. Chambers 28, 30 and 32 are filled with hydraulic oil. As the rack 2 moves upwardly (as shown in FIG. 1) the working piston 10 will hit the contact means 40. The piston 24 will move upwardly and force oil out of the chamber 30 through the metering orifices 26 into chamber 32 and through orifices 34 into chamber 28 on the opposite side of the piston. The total volume of chambers 28, 30 and 32 remains constant during movement of the piston 24 and the hydraulic oil will, therefore, circulate only within the housing 20. As piston 24 continues its upward travel, it will pass over an increasing number of metering orifices 26, thus reducing the metering area through which oil can escape from the chamber 30. The diameters and location of the metering orifices 26 can be adapted to the decreasing velocity of the piston 24 so that the pressure difference between chamber 28 and chamber 30, and therewith the deceleration of the piston 24, remains substantially constant during the entire stroke of the piston 24. Calculation shows that such an arrangement, which is suitable for a given impact velocity V, (the velocity at which the working piston 10 impacts the contact means 40), provides almost constant deceleration at other velocities of the piston 24 and does not, therefore, require any adjustments or changes in metering orifice area as long as the mass M of the reciprocating means, such as rack 2, does not vary too greatly.

The size of the metering orifice 27 (the last metering orifice to be closed by piston 24) is chosen to limit the velocity of the piston 24 to a safe value after the kinetic energy of mass M has been greatly reduced and only the force of the working piston 10 is acting on the piston 24.

The use of metering orifices 26 and 27 in cylinder 22 having a dimension in the direction of flow of fluid therethrough (i.e., axially) which is small in comparison with the diameter of the orifices results in the hydraulic cushioning means being almost insensitive to variations in the viscosity of the hydraulic oil, which are encountered in a working temperature range of 50° to 100° C. The hydraulic cushioning means of the present invention will, therefore, give a good cushion with almost constant deceleration during the major portion of cushioning which is independent of oil viscosity or impact velocity of the cushioned mass M as long as the mass M does not exceed the range for which metering orifices 26 and 27 have been designed.

A further advantage of the hydraulic cushioning means of the present invention results from the arrangement of the oil supply path which is designed to provide automatic venting of the cushioning means by placing the oil outlet at the highest point of each cushioning means 16, 18 and 70 so that any air therein will rise to the outlet. This eliminates the danger of air accumulating in the chambers 32, 56 or 84, respectively.

The hydraulic oil supply system will now be described. It will be realized by those skilled in the art that if leakage of hydraulic oil from moving machinery could be completely prevented, and if oil did not lose its properties with time, the oil supply system would not be required by the hydraulic cushioning means.

An automatic central lubrication system is normally provided for each I. S. glassware forming machine and connected thereto for lubricating various components of the machine. The system shown on the drawings has been greatly simplified for clarity. A pump 100 in the lubrication system is caused to operate during predetermined intervals of time by a programmer. The pump 100 supplies oil at high pressure to an injector 102, causing the injector to force a measured amount of oil into the mechanism which is connected to the injector. The cushioning means can use the lubricating oil as its hydraulic fluid and does not use up any oil (except for that small amount which leaks out), but the oil is preferrably changed from time to time as it loses some of its lubricating properties with time. The cushioning means 16 and 18 are, therefore, connected in series by the oil supply line 104 between the injector 102 and the line 106 and check valve 108 to the mechanism to be lubricated (not shown), thereby ensuring that with each lubricating cycle of the pump 100, a certain amount of the oil contained in the cushioning means 16 and 18 will be supplied to the mechanism requiring lubrication via line 106, and a like amount of fresh oil will be introduced into the cushioning means by the injector 102. As the fresh oil is forced into the inlet 110 of cushioning means 18 by injector 102, some of the older oil will flow out of outlet 112 of cushioning means 18, through line 104 to the inlet 114 of the cushioning means 16. The oil introduced at the inlet 114 will force oil to flow out of the cushioning means 16 through outlet 116, and through line 106 and check valve 108 to the mechanism.

A certain amount of leakage cannot be prevented, as discussed heretofore. Pressure sensing means 118 may be disposed in the hydraulic system at some desirable location. A satisfactory location is shown in FIG. 5. Pressure sensing means 118 may be disposed at port 120 and is operatively connected by means 120 to the pump 100. The pressure sensor may be set to actuate the pump 100 if the pressure in the hydraulic cushioning circuit falls below a predetermined limit. The pump will operate, in connection with the injector 102, to add a sufficient amount of fresh oil to bring the pressure of the oil back up to a predetermined value. It will be realized by those skilled in the art that other methods of maintaining a predetermined oil pressure in the cushioning circuit may be utilized. The only requirement is that fresh oil be added to the cushioning circuit when the pressure falls below a predetermined minimum. By doing this the pressure in the system prevents air from entering into the oil circuit, even if there are small leakages.

There has thus been described a preferred embodiment of an apparatus for hydraulically cushioning a reciprocating member in accordance with my invention. It will be understood by those skilled in the art that various changes and omissions in the form and detail thereof may be made therein without departing from the spirit and scope of the invention, which is to be limited only as set forth in the following claims.

What I claim as novel and desire to secure by Letters Patent of the United States is:

1. In a glassware forming machine, apparatus for hydraulically cushioning the motion of reciprocating means in both directions, comprising:
   means for reciprocating the reciprocating means;
   first hydraulic cushioning means disposed to be contactable by the reciprocating means to cushion the motion of the reciprocating means in one direction, said first cushioning means comprising a first housing, a cylinder disposed in said first housing, said cylinder having a plurality of metering orifices therein, a piston slidably disposed in said cylinder and forming with said cylinder a first chamber on one side of said piston and second chamber on the opposite side of said piston, a third chamber adapted to be filled with liquid, disposed between said first housing and said cylinder and in fluid communication with said first and second chambers, said piston adapted to be contacted by the reciprocating means near the end of the stroke of the reciprocating means in the direction of said first cushioning means;

second hydraulic cushioning means disposed to be contactable by the reciprocating means to cushion the motion of the reciprocating means in the opposite direction, said second cushioning means comprising a second housing, a cylinder disposed in said second housing, said cylinder having a plurality of metering orifices therein, a piston slidably disposed in said cylinder and forming with said cylinder a first chamber on one side of said piston and a second chamber on the opposite side of said piston, a third chamber adapted to be filled with liquid, disposed between said second housing and said cylinder and in fluid communication with said first and second chambers, said piston adapted to be contacted by the reciprocating means near the end of the stroke of the reciprocating means in the direction of said second cushioning means;

said metering orifices of said first and second hydraulic cushioning means each having a diameter which is greater than the dimension of the orifices in the direction of the flow of fluid therethrough, whereby said first and second hydraulic cushioning means each provide a cushion with substantially constant deceleration of the reciprocating means and which is independent of the viscosity of said liquid; and means for adjusting the position at which the reciprocating means contacts at least one of said first and second hydraulic cushioning means.

2. Apparatus for hydraulically cushioning the motion of reciprocating means as defined in claim 1, wherein the means for adjusting the position at which the reciprocating means contacts one of said first and second hydraulic cushioning means comprises:

a shaft disposed in the reciprocating means having a longitudinal axis substantially parallel to the longitudinal axis of the reciprocating means;

contact means disposed on one end of said shaft and adapted to contact said piston on said hydraulic cushion means as the reciprocating means nears the end of its stroke in the direction of said cushioning means; and adjustable locking means adapted to engage said shaft opposite the end on which said contact means is disposed for adjustably locking said shaft and said contact means to the reciprocating means.

3. Apparatus for hydraulically cushioning the motion of reciprocating means as defined in claim 1, wherein the means for adjusting the position at which the reciprocating means contacts one of said first and second hydraulic cushioning means comprises:

a shaft disposed in said piston of said hydraulic cushioning means to be contacted, the longitudinal axis of said shaft being substantially parallel to the axis of said piston, said shaft extending in at least one direction beyond said housing of said cushioning means;

contact means disposed on said end of said shaft extending beyond said housing and adapted to contact a portion of the reciprocating means as the reciprocating means nears the end of its stroke in the direction of said cushioning means; and adjustable locking means adapted to engage the end of said shaft opposite the end on which said contact means is disposed for adjustably locking said contact means with respect to said piston.

4. Apparatus for hydraulically cushioning the motion of reciprocating means as defined in claim 1, wherein the means for adjusting the position at which the reciprocating means contacts one of said first and second hydraulic cushioning means comprises:

a threaded shaft disposed in said piston of said hydraulic cushioning means to be contacted, the longitudinal axis of said shaft being substantially parallel to the axis of said piston;

contact means being one end of said threaded shaft and adapted to contact said reciprocating means as the reciprocating means nears the end of its stroke in the direction of said cushioning means; and adjustable locking means adapted to engage the end of said shaft opposite the contact means end of said shaft for adjustably locking said shaft with respect to said piston.

5. Apparatus for hydraulically cushioning the motion of reciprocating means as defined in claim 1, wherein the total volume of said first chamber, said second chamber and said third chamber of said first hydraulic cushioning means remains constant during operation of said first cushioning means.

6. Apparatus for hydraulically cushioning the motion of reciprocating means as defined in claim 1, wherein the total volume of said first chamber, said second chamber and said third chamber of said second hydraulic cushioning means remains constant during operation of said second cushioning means.

7. In a glassware forming machine, apparatus for hydraulically cushioning the motion of reciprocating means in both directions comprising:

means for reciprocating the reciprocating means;

first hydraulic cushioning means disposed to be contactable by the reciprocating means to cushion the motion of the reciprocating means in one direction, said first cushioning means comprising a first housing, a cylinder disposed in said first housing, said cylinder having a plurality of metering orifices therein, a piston slidably disposed in said cylinder and forming with said cylinder a first chamber on one side of said piston and a second chamber on the opposite side of said piston, a third chamber adapted to be filled with liquid, disposed between said first housing and said cylinder and in fluid communication with said first and second chambers, said piston adapted to be contacted by the reciprocating means near the end of the stroke of the reciprocating means in the direction of said first cushioning means;

second hydraulic cushioning means disposed to be contactable by the reciprocating means to cushion the motion of the reciprocating means in the opposite direction, said second cushioning means comprising a second housing, a cylinder disposed in said second housing, said cylinder having a plurality of metering orifices therein, a piston slidably disposed in said cylinder and forming with said cylinder a first chamber on one side of said piston and a second chamber on the opposite side of said piston, a third chamber adapted to be filled with liquid, disposed between said second housing and said cylinder and in fluid communication with said first and second chambers, said piston adapted to be contacted by the reciprocating means near the end of the stroke of the reciprocating means in the direction of said second cushioning means;

means for adjusting the position at which the reciprocating means contacts at least one of said first and second hydraulic cushioning means;

fluid connection means for connecting said first hydraulic cushioning means with said second hydraulic cushioning means;

fluid inlet means in said third chamber of said first hydraulic cushioning means in fluid connection with a source of hydraulic fluid;

fluid outlet means in said third chamber of said second hydraulic cushioning means;

means for sensing the fluid pressure in one of said first and second hydraulic cushioning means; and means for adding additional hydraulic fluid to said fluid inlet means in response to a pressure sensed by said means for sensing the fluid pressure below a predetermined limit.

* * * * *

UNITED STATES PATENT OFFICE
CERTIFICATE OF CORRECTION

Patent No. 4,043,254  Dated August 23, 1977

Inventor(s) Eginhard Jaeger

It is certified that error appears in the above-identified patent and that said Letters Patent are hereby corrected as shown below:

Col. 2, line 9, "beomes" should be --becomes--.

Col. 2, line 22, "on on" should be --on one--.

Col. 5, line 61, "32" should be --38--.

Signed and Sealed this

Thirty-first Day of January 1978

[SEAL]

Attest:

RUTH C. MASON  
Attesting Officer

LUTRELLE F. PARKER  
Acting Commissioner of Patents and Trademarks